Aug. 21, 1956

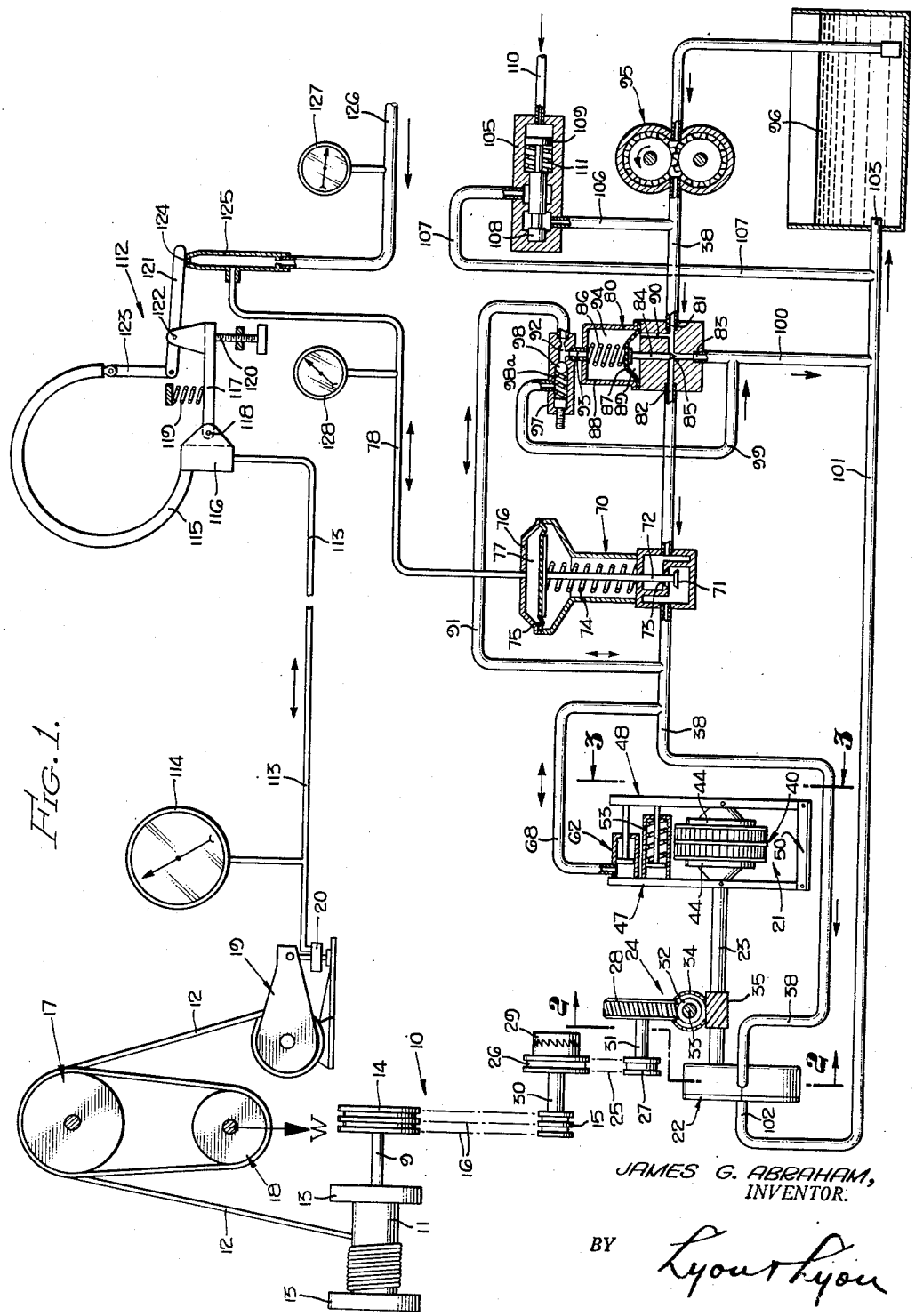

J. G. ABRAHAM 2,759,702

DRILLING CONTROL

Filed March 25, 1952

JAMES G. ABRAHAM,
INVENTOR.

BY

*Lyon+Lyon*

ATTORNEYS

JAMES G. ABRAHAM,
INVENTOR.

BY Lyon+Lyon
ATTORNEYS

United States Patent Office 2,759,702
Patented Aug. 21, 1956

2,759,702

DRILLING CONTROL

James G. Abraham, Rolling Hills, Calif., assignor to The National Supply Company, Pittsburgh, Pa., a corporation of Pennsylvania Application March 25, 1952, Serial No. 278,401

15 Claims. (Cl. 254—173)

This invention relates to control apparatus for regulating movement of a work member under an applied force. The invention will be described for rotary drilling rigs, but it will be understood that in its broader aspects it is not limited to this particular use. This invention relates to improvements over the device shown in my copending application for drawworks feed control, Serial No. 7,237, filed February 9, 1948, now Patent No. 2,650,796.

Among the objects of this invention is to provide an improved apparatus for controlling movement of a work member by means of a brake and a fluid metering device connected to displace a given quantity of fluid for each increment of motion of the work member, and thereby regulate the action of the brake.

Another object is to provide a device of this type which is useful in controlling the rate of unspooling movement of a drum having one end of a tensioned cable spooled thereon.

Another object is to provide an improved device for controlling the paying out of a tensioned cable from a spooling drum, the rate of unspooling being automatically regulated by changes in the magnitude of the tension in the cable.

A more particular object is to provide an improved feed control apparatus for a well drilling rig which utilizes speed increasing means for connecting a brake and a fluid metering device in driving relationship with the spooling drum, and wherein fluid under pressure is supplied through a conduit to the metering device, together with fluid operated brake-releasing means operated from said conduit whereby a decrease in the rate of unspooling movement of the drum decreases the rate of discharge of the metering device and increases back pressure in the conduit to intensify the action of the brake-releasing means.

Another object is to provide a device of this type employing a flow control valve for regulating the flow of hydraulic fluid in said conduit.

Another object is to provide a device of this type in which means are provided for maintaining the pressure drop across said flow control valve at a substantially constant value.

A related object is to provide a metering device which will act under the influence of applied hydraulic pressure to assist in overcoming friction in the gear elements at the high speed end of the gear train connecting the metering pump and brake to the spooling drum. The action of the metering device therefore contributes to increased responsiveness of the feed control system.

Other and more detailed objects and advantages will appear hereinafter.

In the drawings:

Figure 1 is a diagrammatic illustration of drilling control apparatus involving my invention.

Figure 5:
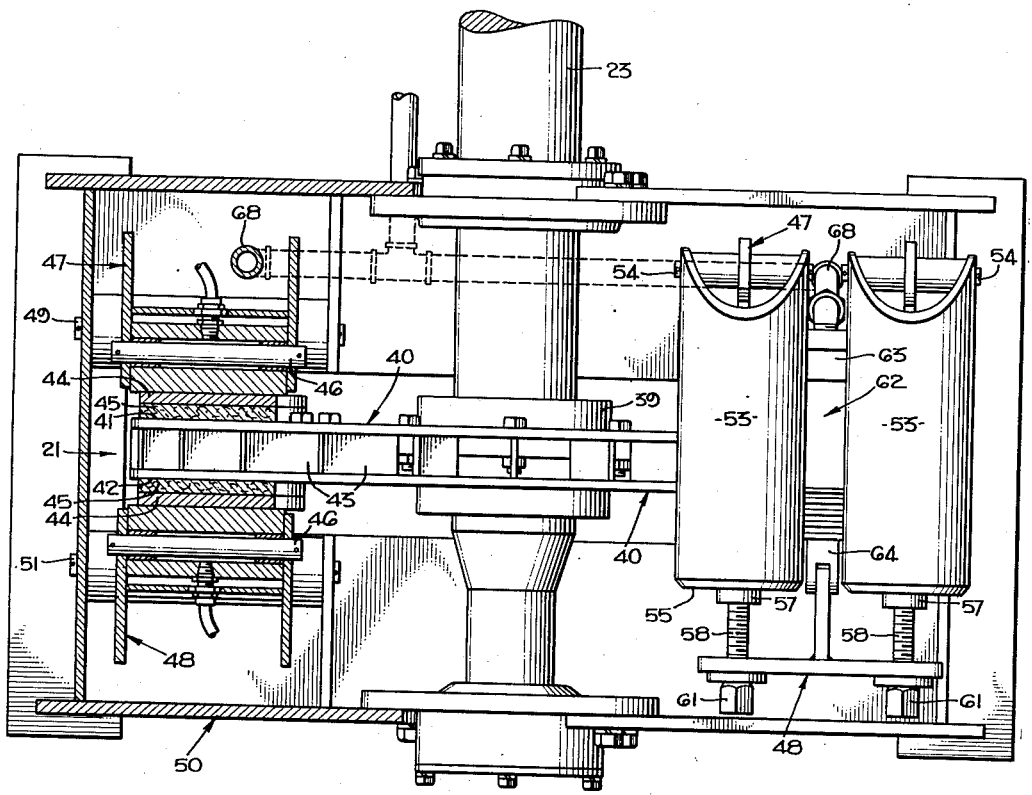
Figure 3:
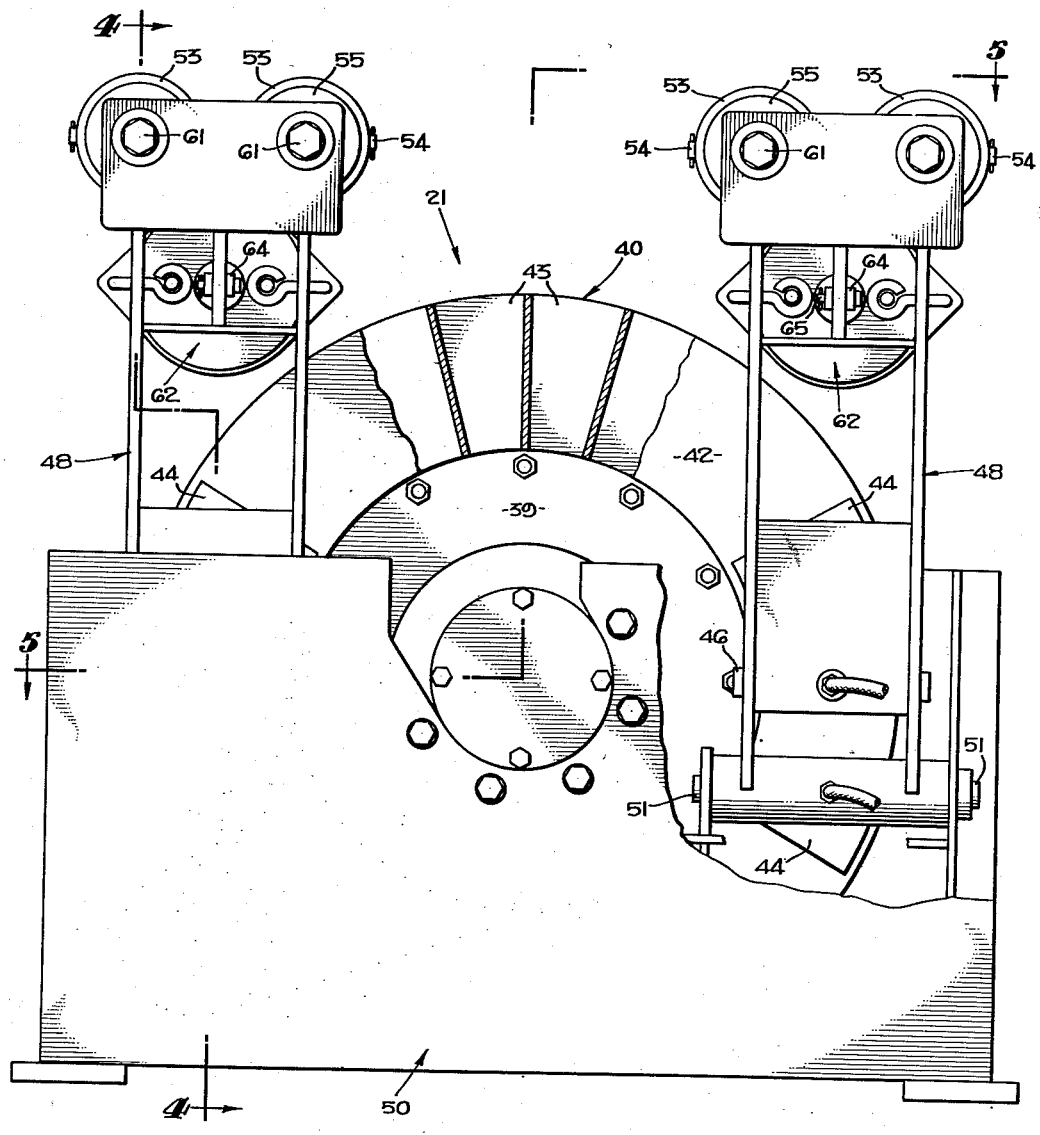
Figure 4:
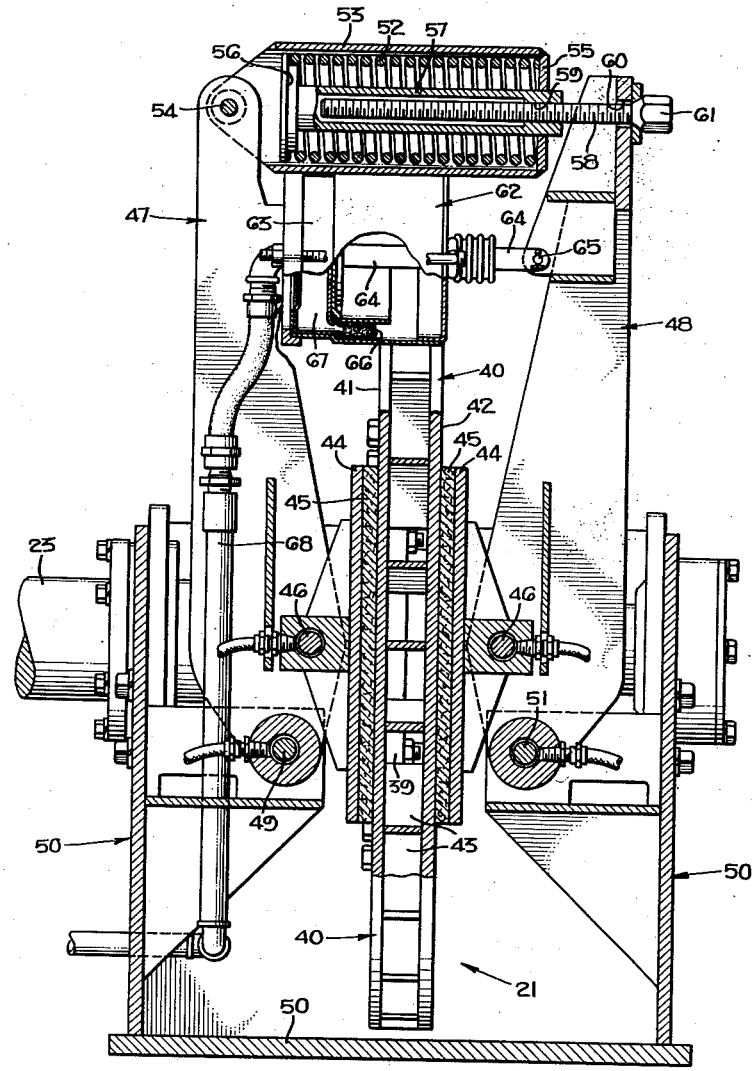

Figures 3, 4 and 5 show details of construction of one form of brake apparatus useful in connection with my invention. Figure 3 is a side elevation partly broken away taken substantially in the direction 3—3 as shown in Figure 1. Figure 4 is a sectional elevation taken substantially on the line 4—4 as shown in Figure 3. Figure 5 is a plan view partly in section taken substantially on the line 5—5 as shown in Figure 3.

Referring to the drawings, a drawworks generally designated 10 is provided with the usual spooling drum 11 having one end of a tensioned cable 12 spooled thereon. The drum 11 is provided with the usual brake rims 13 over which conventional brake bands (not shown) may be installed. The drum is driven by means of a sprocket 14 fixed on the drumshaft 9 or otherwise connected in driving relationship with the drum 11. A driving sprocket 15 is connected by chain 16 to the sprocket 14. The sprocket 15 may be mounted on a jackshaft 30 of the drawworks 10. The cable 12 passes around the various sheaves of the crown block 17 and traveling block 18, and the dead end of the cable 12 is secured to the anchor device 19. This cable anchor device is preferably of the type shown in the Spalding Patent 2,488,070 and includes a capsule 20 confining a fluid body under pressure. The pressure of the fluid body is proportional to the tension in the cable 12. The drill string (not shown) is suspended from the traveling block 18, and the usual drilling bit is provided on the lower end of the drill string.

In accordance with my invention I provide a brake device generally designated 21 and a metering device generally designated 22. These two devices 21 and 22 are preferably direct connected by means of the high speed shaft 23, although the connection between them may be via any suitable power transmission connections. The rotary speed of one, however, should be proportional to the rotary speed of the other. As shown in the drawings, the high-speed shaft 23 is connected through the double reduction worm gear unit 24 and chain drive 25 to the jackshaft 30. The chain drive through the sprockets 14 and 15, chain drive 25, and the gear drive 24 constitute speed increasing means whereby the speed of the high-speed shaft 23 is proportional to the speed of turning movement of the spooling drum 11. The various elements of this speed increasing means are shown in diagrammatic form only, and it will be understood that the sprockets 15 and 26 rotate as a unit, and that sprocket 27 rotates as a unit with the worm wheel 28. A clutch 29 is provided to disconnect the sprocket 26 from the jackshaft 30.

The double reduction worm gear unit 24 includes the worm wheel 28 fixed on the shaft 31 and driven by a worm pinion 32 on transverse shaft 33. A gear 34 also fixed on this transverse shaft is driven by the gear 35 on the high-speed shaft 23. The helix angles of the gears are such that power can be transmitted through the unit 24 in either direction. Thus the gear 35 can be rotated to effect turning movement of the worm wheel 28, or conversely, the worm wheel 28 can be driven to cause rotation of the gear 35.

Figure 2:
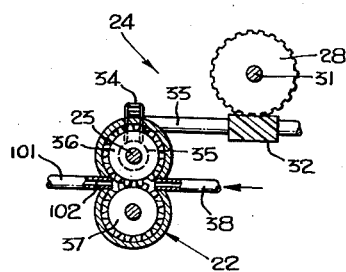
Figure 2 is a sectional detail in diagrammatic form taken substantially on the line 2—2 as shown in Figure 1.

The metering device 22 may taken the form of a gear pump of conventional design. One of the pump gears 36 (Figure 2) is fixed to the high-speed shaft 23 and the other gear 37 is driven by the meshing gear 36. Means are provided for supplying hydraulic fluid to the metering device 22, and as shown in the drawings this means includes the conduit 38.

The brake device 21 includes a hub 39 fixed relative to the high-speed shaft 23. The hub carries an annular disk 40 having friction surfaces 41 and 42. Cooling passages 43 may be provided between the surfaces 41 and 42 through which air may circulate. Arcuate friction shoes 44 are mounted on opposite sides of the central annular disk 40 and are provided with friction lining 45 for engaging the surfaces 41 and 42. Each of the friction shoes 44 is connected by a pivot pin 46 to one of the clamp arms 47 and 48. Two pairs of clamp arms 47, 48 are mounted on the stationary frame 50, as clearly shown in Figure 3. Each clamp arm 47 is pivotally supported at 49 on the stationary frame 50 and similarly, each clamp arm 48 is pivotally mounted at 51 on the frame 50.

Two pairs of clamp arms 47, 48 are provided, but since they are substantially identical a description of one pair will suffice. As shown in Figure 4, a coil spring 52 is provided for drawing the upper ends of the crank arms 47 and 48 toward each other and thereby bringing the friction shoes 44 into engagement with the central disk 40, and consequently applying the brake. The coil spring 52 may be positioned within a shell 53 pivotally secured at 54 to the upper end of the arm 47. One end of the spring 52 bears against the end wall 55 of the shell 53. The other end of the spring 52 engages the end flange 56 of the hollow tension rod 57 extending co-axially of the spring and projecting through the end wall 55 in telescopic relation. Tension bolt 58 engages threads 59 within the hollow member 57 and the bolt extends through an aperture 60 in the upper end of the crank arm 48. The bolt head 61 may be turned if necessary to adjust the initial position of the brake shoes 44 with respect to the brake disk 40.

Fluid operated brake-releasing means are provided for overcoming the action of the coil spring 52. As shown in the drawings, this means includes the hydraulic cylinder assembly 62 which has a stationary housing 63 fixed relative to the crank arm 47 and a movable rod 64 pivotally connected at 65 to the crank arm 48. The hydraulic cylinder assembly 62 may employ a piston acting within a cylinder, or as shown in Figures 3, 4 and 5 of the drawings may employ a flexible diaphragm 66 which cooperates with the housing 63 to define an expansible chamber 67. The chamber 67 is connected via suitable piping 68 to the hydraulic fluid supply conduit 38.

When the pressure of hydraulic fluid in the piping 68 increases, the hydraulic cylinder assembly functions to separate the upper ends of the clamp arms 47 and 48, thereby compressing the coil spring and reducing the pressure of the brake shoes 44 against the central disk 40. This allows the brake disk and shaft 23 to turn. When the hydraulic pressure in the piping 68 decreases the coil spring 52 brings the upper ends of the clamp arms 47 and 48 together to increase the pressure of the brake shoes 44 on the disk 40 and thereby increase the braking action.

A flow control valve assembly generally designated 70 is mounted in the fluid pressure supply conduit 38. The assembly 70 includes a valve head 71 mounted on a stem 72 and arranged to control the rate of flow through a port 73. A coil spring 74 acts in a direction to move the valve head 71 upward to restrict flow through the port 73. A diaphragm 75 cooperates with the valve body 76 to define an expansible chamber 77, and a pneumatic line 78 communicates with this chamber 77. When pneumatic pressure in the line 78 increases the diaphragm 75 moves down against the action of the spring 74. Conversely, when the pneumatic pressure in the line 78 decreases, spring 74 raises the valve stem 72 to restrict flow through the valve assembly 70.

Means are provided for maintaining the pressure drop across the flow control valve assembly 70 at a substantially constant value. As shown in the drawings, this means includes the differential pressure valve, generally designated 80. This valve 80 is mounted in the hydraulic fluid pressure supply conduit 38 and is provided with an inlet 81, an outlet 82, and a by-pass outlet 83. A stem 84 is shown schematically with a pointed lower end 85 for regulating the amount of hydraulic fluid permitted to escape through the by-pass outlet 83. A coil spring 86 acts to move the stem 84 downward. A diaphragm 87 cooperates with the valve housing 88 to define an expansible pressure chamber 89 which communicates with the pressure supply pipe via passageway 90. Pressure in the chamber 89 serves to raise the diaphragm 87 in the stem 84 against the action of the coil spring 86. The by-pass line 91 is connected at one end to the pressure supply pipe 38 at a location downstream from the flow control valve assembly 70. The other end of the by-pass line 91 is connected through passage 92 and 93 with the space 94 above the diaphragm 87. From this description it will be understood that if the pressure in the line 38 downstream from the valve assembly 70 should fall more than a desired amount below the pressure upstream from the valve assembly 70, this lower pressure is reflected through line 91 to the space 94. The diaphragm 87 then raises slightly against the action of the spring 86 thereby raising the stem 84 and consequently lowering the pressure in the supply pipe 38 between the valves 70 and 80 by allowing a larger proportion of hydraulic fluid to escape through the by-pass outlet 83. Since the pressure drop across the control valve 70 is kept substantially constant, the rate of flow of hydraulic fluid control valve 70 is accurately determined by the vertical position of the stem 72.

A pump, generally designated 95 is provided for delivering the fluid under pressure from the reservoir 96 to the pressure supply pipe 38. The pump 95 may take any convenient or desirable form. It may be driven from the rotary drive mechanism, not shown, of the drawworks 10 or it may be driven by an independent source of power, if desired.

A relief valve 97 is connected with the by-pass line 91 and may include a ball element 98 seated by means of a spring 98a. If the pressure in the by-pass line 91 exceeds a predetermined value, the ball 98 is unseated to allow flow to occur through the piping 99 and 100 to the return line 101. The piping 100 connects with the by-pass outlet 83 of the valve assembly 80. The return line 101 extends from the outlet 102 of the metering device 22 to the inlet 103 of the reservoir 96.

It is desirable to provide means for preventing operation of the feed control apparatus at all times when the rotary machine, not shown, is at rest. In other words, it is desirable to have the feed control apparatus active only when the rotary machine is turning the drill string. If the pump 95 is driven from the rotary machine drive provided in the drawworks, the pump turns only when the rotary machine turns, which is the desired mode of operation. If, however, the pump 95 is driven from a separate source of power, not shown, it is desirable to provide an interlock so that hydraulic fluid under pressure passes through the control valve 70 only when the rotary machine is operating. Such an interlock is shown in Figure 1 of the drawings wherein a by-pass valve 105 is connected to a line 106 communicating with the pressure supply pipe 38, and the line 107 communicating with the return line 101. A valve plunger 108 is held in the position shown in the drawings by means of the piston 109 whenever pneumatic pressure is supplied in pipe 110. When pressure in the pipe 110 is exhausted, the coil spring 111 shifts the piston 109 and plunger 108 to the left thereby establishing communication between the pipes 106 and 107. The pneumatic line 110 is connected to the source of pneumatic pressure for operating a rotary machine drive clutch, not shown, which is included as part of the drawworks 10. Whenever pneumatic pressure is supplied for closing the clutch to drive the rotary machine, this pressure is reflected through line 110 to shift the valve plunger 108 to the position shown. When the pneumatic pressure is exhausted to disengage such rotary machine drive clutch the plunger 108 is shifted to the left and consequently the hydraulic fluid delivered by the pump 95 passes through pipes 106 and 107 and returns to the reservoir through inlet 103.

In order that the unspooling movement of the drum 11 may be controlled by tension in the cable 12 and thereby automatically control the rate of feed of the drill string, I provide a control mechanism, generally designated 112. This mechanism 112 is shown diagrammatically in Figure 1, and its function is to vary the pneumatic pressure supplied through pipe 78 in accordance with variations in hydraulic pressure in the line 113 which communicates with the pressure capsule 20 of the fluid body therein. The hydraulic pressure in this line 113 registers on the pressure gauge 114 which is calibrated as a weight indicator for the driller who is in control of the operations of the drilling rig. The hydraulic pressure in line 113 passes into the Bourdon tube 115 which is mounted on a stationary bracket 116. An arm 117 is pivotally supported on the bracket 116 at 118. A coil spring 119 holds the arm 117 against an adjustable stop screw 120. A flapper valve 121 is pivoted at 122 on the arm 117. A link 123 pivotally connects the free end of the Bourdon tube to one end of the flapper valve 121. The swinging end of the flapper valve 121 is adapted to close an orifice 124 provided in the fitting 125. Pneumatic pressure is supplied to the fitting through line 126 and the magnitude of the pressure is indicated by gauge 127. The pipe 78 communicates with the fitting 125 and the pressure in the pipe 78 is shown by the gauge 128. When the flapper valve 121 closes the orifice 124 the pneumatic pressure in the pipe 78 is the same as the pressure supplied in the pipe 126. When the flapper valve 121 swings away from the fitting 125 to permit leakage through the orifice 124, the pressure within the fitting 125 is reduced and the pressure in the pipe 78 is likewise reduced. From this description it will be understood that the setting of the adjustable stop screw 126 controls the vertical position of the stem 72 of the control valve 70 for any given value of hydraulic pressure in the line 113. When the pressure in line 113 increases, the Bourdon tube 115 straightens out slightly moving the flapper valve 121 toward the fitting 125 thereby reducing the rate of escape of pneumatic fluid from the fitting 125 and increasing the pressure in pipe 78. Thus an increase in hydraulic pressure in pipe 113 causes an increase in the rate of flow through the control valve 70. Conversely, a reduction in hydraulic pressure in pipe 113 causes a reduction in the rate of flow of the control valve assembly 70.

In operation, the clutch 29 is closed to connect the metering device 22 and brake device 21 in driving relationship with the spooling drum 11. The pump 95 is driven to supply hydraulic fluid under pressure to the pipe 38. The conventional brake bands, not shown, which encompass the brake rims 13 on the spooling drum 11 are relaxed to allow the brake device 21 to control unspooling movement of the drum 20. The rate of turning of the drum is controlled by the setting of the stop screw 120. The turning force of the drum passes through the speed increasing means provided by the chain 16, chain drive 25 and double reduction worm gear unit 24. The torque load thus applied by the tensioned cable 12 to the spooling drum 11 is transmitted through the speed increasing means to the high speed shaft 23.

Pressure in the hydraulic fluid supply pipe 38 acts on the metering device 22 in a direction tending to turn the shaft 23 in a direction corresponding to unspooling movement of the drum 11. This action assists in reducing the friction in the highspeed end of the gear train. Furthermore, the torque applied to the shaft 23 by the gear train tends to turn it in the same direction. The coil spring 52 holds the brake shoes 44 in pressural engagement with the brake disk 40 and thereby prevents turning of the shaft 23 until back pressure builds up in the pipe 38. This back pressure is reflected through piping 68, and when it reaches a sufficient intensity is effective to cause the hydraulic cylinder assembly 62 to separate the upper ends of the clamp arms 47 and 48 against the action of the spring 52. This reduces the intensity of pressure between the brake shoes 44 of the disk 40 and allows the disk 40 and shaft 23 to turn. Turning of the shaft 23 allows the metering device 22 to displace fluid from the pipe 38 to the return line 101.

If the high-speed shaft should tend to run at too great a speed, the metering device 22 will displace hydraulic fluid from the pipe 38 to the return line 101 faster than it is supplied through control valve 70. Consequently, the pressure in the pipe 38 downstream from the control valve 70 falls off. This decrease in pressure is reflected through line 68 and hence the force exerted by the hydraulic cylinder assembly 62 diminishes, permitting the spring 52 to apply greater pressure to the brake shoes 44. This increases the friction drag against the brake disk 40 and acts to reduce the speed of the shaft 23. Similarly, if the shaft 23 should turn at a lower speed, the metering device will not remove hydraulic fluid from the pipe 38 as fast as it is supplied through the control valve 70, with the result that back pressure increases in the pipe 38 downstream from the control valve 70. This increase in back pressure is reflected through pipe 68 to intensify the action of the hydraulic cylinder assembly 62. The spring 52 is further compressed and the pressural engagement of the brake shoes 44 against the disk 40 is relaxed, thereby allowing the disk 40 and shaft 23 to increase in speed.

So long as the stem 72 of the control valve assembly 70 remains at a fixed elevation, the highspeed shaft 23 rotates at the same speed. If the hydraulic pressure in the line 113 decreases, thereby indicating an excessive weight on the bit, the mechanism 112 operates to decrease the pressure in the pipe 78 as explained above. This causes the valve stem 72 to raise and thereby reduce the rate of flow through hydraulic fluid through the control valve assembly 70. This in turn decreases the pressure in the pipe 68 and allows the spring 52 to apply the brake to reduce the speed of rotation of the shaft 23 and the spooling drum 11. The rate of paying out of the cable 12 is thereby diminished and the bit "drills off." Conversely, increase in pressure in the hydraulic line 113 is effective to reduce the braking effect and permit the shaft 23 and spooling drum 11 to turn at a higher speed.

Having fully described my invention, it is to be understood that I do not wish to be limited to the details herein set forth, but my invention is of the full scope of the appended claims.

I claim:

1. In a device for controlling the movement of a work member subjected to an applied force, the combination of: a brake connected to restrain movement of the work member, a fluid metering device operatively connected to said work member so that the volume of fluid metered is proportional to the movement of said work member, means including a conduit to supply fluid under pressure at a pre-determined rate of flow to said metering device, and fluid pressure responsive brake-releasing means connected to said conduit, whereby a decrease in the rate of movement of said work member decreases the speed of operation of said metering device, increases back pressure in said conduit, and thereby intensifies the action of the brake-releasing means.

2. In a device for controlling the movement of a work member subjected to an applied force, the combination of: a brake connected to restrain movement of the work member, a fluid metering device operatively connected to said work member so that the volume of fluid metered is proportional to the movement of said work member, means including a conduit to supply fluid under pressure at a pre-determined rate of flow to said metering device, resilient means acting to set the brake, and fluid pressure responsive means connected to said conduit for releasing the brake, whereby an increase in the rate of movement of said work member increases the speed of operation of said metering device and reduces back pressure in said conduit to increase the braking effect of the resilient means.

3. In a device for controlling the speed of rotation of a work member subjected to a turning force, the combination of: a brake connected to impede rotation of the work member, a fluid metering device driven by said work member at a speed proportional to the speed of rotation of the work member, means including a conduit to supply fluid under pressure at a pre-determined rate of flow to said metering device, and fluid pressure responsive brake-releasing means connected to said conduit, whereby a decrease in the rate of turning of said work member decreases the speed of operation of said metering device, increases back pressure in said conduit, and thereby intensifies the action of the brake-releasing means.

4. In a device for controlling the speed of rotation of a work member subjected to a turning force of varying magnitude, the combination of: a brake connected to impede rotation of the work member, a fluid metering device driven by said work member at a speed proportional to the speed of rotation of the work member, means including a conduit to supply fluid under pressure at a pre-determined rate of flow to said metering device, resilient means acting to set the brake, and fluid pressure responsive means connected to said conduit for releasing the brake, whereby an increase in the rate of turning of said work member increases the speed of operation of said metering device and reduces back pressure in said conduit to increase the braking effect of the resilient means.

5. In a device for controlling the speed of rotation of a work member subjected to a turning force of varying magnitude, the combination of: a rotary element connected to turn at a speed proportional to that of said work member, a brake connected to impede rotation of said element, a fluid metering device driven by said element, means including a conduit to supply fluid under pressure at a predetermined rate of flow to said metering device, and fluid pressure responsive brake-releasing means connected to said conduit, whereby a decrease in the rate of turning of said element decreases the speed of operation of said metering device, increases back pressure in said conduit, and thereby intensifies the action of the brake-releasing means.

6. In a device for controlling the speed of rotation of a work member subjected to a turning force of varying magnitude, the combination of: a rotary element connected to turn at a speed proportional to that of said work member, a brake connected to impede rotation of said element, a fluid metering device driven by said element, means including a conduit to supply fluid under pressure at a predetermined rate of flow to said metering device, resilient means acting to set the brake, and fluid pressure responsive means connected to said conduit for releasing the brake, whereby an increase in the rate of turning of said element increases the speed of operation of said metering device and reduces back pressure in said conduit to increase the braking effect of the resilient means.

7. In a device for controlling the speed of rotation of a work member subjected to a turning force, the combination of: a rotary element, speed increasing means for driving the rotary element at a speed proportional to that of said work member, a brake connected to impede rotation of said element, a fluid metering device driven by said element, means including a conduit to supply fluid under pressure at a predetermined rate of flow to said metering device, and fluid pressure responsive means connected to said conduit for releasing the brake, whereby a decrease in the rate of turning of said element decreases the speed of operation of said metering device, increases back pressure in said conduit, and thereby intensifies the action of the brake-releasing means.

8. In a device for controlling the speed of rotation of a drum having one end of a tensioned cable spooled thereon, the combination of: a rotary element, speed increasing means for causing the rotary element to turn at a speed proportional to that of said spooling drum, a brake connected to impede rotation of said element, a fluid metering device driven by said element, means including a conduit to supply fluid under pressure at a predetermined rate of flow to said metering device, a flow-regulating valve in the conduit, and fluid pressure responsive means connected to said conduit downstream from said valve for releasing the brake, whereby a decrease in the rate of turning of said element decreases the speed of operation of said metering device and increases back pressure in said conduit to intensify the action of the brake-releasing means.

9. In a device for controlling the speed of rotation of a drum having one end of a tensioned cable spooled thereon, the combination of: a rotary element, speed increasing means for causing the rotary element to turn at a speed proportional to that of said spooling drum, a brake connected to impede rotation of said element, a fluid metering device driven by said element, means including a conduit to supply fluid under pressure to said metering device, a flow-regulating valve in the conduit, means for maintaining a substantially constant pressure differential across said flow-regulating valve, and fluid pressure responsive means connected to said conduit downstream from said valve for releasing the brake, whereby a decrease in the rate of turning of said element decreases the speed of operation of said metering device and increases back pressure in said conduit to intensify the action of the brake-releasing means.

10. A feed control device for a rotary drilling rig, the rig having a spooling drum for spooling one end of a tensioned cable and having a cable-tension measuring device employing a fluid body under pressure proportional to the cable tension, the improvement comprising, in combination: a brake, means operatively connecting the brake in driving relationship with the spooling drum, means for actuating the brake to impede rotation of the spooling drum under the torque load applied by the tensioned cable, fluid pressure operated brake-releasing means operatively connected to release the brake to permit the spooling drum to unspool the tensioned cable, a fluid metering device operatively connected to said spooling drum and driven at a speed proportional to the rotary speed of said spooling drum, means including a conduit to supply fluid under pressure to said metering device, a flow-regulating valve in the conduit, means responsive to pressure of said fluid body for operating said valve, and means connecting said brake-releasing means to said conduit downstream from said valve.

11. A feed control device for a rotary drilling rig, the rig having a spooling drum for spooling one end of a tensioned cable and having a cable-tension measuring device employing a fluid body under pressure proportional to the cable tension, the improvement comprising, in combination: a brake having a shaft, speed increasing means operatively connecting the brake shaft in driving relationship with the spooling drum, means for actuating the brake to impede rotation of the spooling drum under the torque load applied by the tensioned cable, fluid pressure operated brake-releasing means operatively connected to release the brake to permit the spooling drum to unspool the tensioned cable, a fluid metering device operatively connected to said brake shaft, means including a conduit to supply fluid under pressure to said metering device, a flow-regulating valve in the conduit, means responsive to pressure of said fluid body for operating said valve, and means connecting said brake-releasing means to said conduit downstream from said valve, whereby a decrease in the rate of unspooling movement of the drum decreases the speed of operation of said metering device and increases back pressure in said conduit to intensify the action of the brake-releasing means.

12. A feed control device for a rotary drilling rig, the rig having a spooling drum for spooling one end of a tensioned cable and having a cable-tension measuring device employing a fluid body under pressure proportional to the cable tension, the improvement comprising, in combination: a brake operatively connected to impede rotation of the spooling drum under the torque load applied by the tensioned cable, a fluid metering device operatively connected to said spooling drum and driven at a speed proportional to the rotary speed of said spooling drum, means including a conduit to supply fluid under pressure to said metering device, a flow-regulating valve in the conduit, means for maintaining a substantially constant pressure differential across said flow-regulating valve, means responsive to pressure of said fluid body for operating said valve, and fluid pressure actuated brake-releasing means connected to said conduit downstream from said valve to permit the spooling drum to unspool the tensioned cable.

13. In a device for controlling the speed of rotation of a work member subjected to a turning force, the combination of: a rotary element, speed increasing means for driving the rotary element at a speed proportional to that of said work member, a brake connected to impede rotation of said element, a fluid metering pump driven by said element, means including a conduit to supply fluid under pressure to said metering pump, the pressure in said conduit acting to turn the pump to apply a turning force to the rotary element and thereby offset static friction in the high speed portion of the speed increasing means, and fluid pressure responsive means connected to said conduit for releasing the brake, whereby a decrease in the rate of turning of said element decreases the speed of operation of said metering pump, increases back pressure in said conduit, and thereby intensifies the action of the brake-releasing means.

14. A feed control device for a rotary drilling rig, the rig having a spooling drum for spooling one end of a tensioned cable and having a cable-tension measuring device employing a fluid body under pressure proportional to the cable tension, the improvement comprising, in combination: a brake operatively connected to impede rotation of the spooling drum under the torque load applied by the tensioned cable, a fluid metering device having a rotary shaft, means whereby the shaft is driven at a speed proportional to the speed of rotation of the spooling drum, means including a conduit to supply fluid under pressure to said metering device, a flow-regulating valve in the conduit, means for maintaining a substantially constant pressure differential across said flow-regulating valve, means responsive to pressure of said fluid body for operating said valve, and fluid pressure actuated brake-releasing means connected to said fluid metering device to permit the spooling drum to unspool the tensioned cable.

15. In a device for controlling the movement of a work member subjected to an applied force, the combination of: a brake connected to restrain movement of the work member, a fluid metering device operatively connected to said work member so that the volume of fluid metered thereby is proportional to the movement of said work member, means including a conduit to supply fluid under pressure at a predetermined rate of flow to said metering device, and fluid pressure responsive brake-releasing means connected to said fluid metering device and responsive to pressure delivered thereto.

References Cited in the file of this patent

UNITED STATES PATENTS

| Number | Name | Date |
|---|---|---|
| 1,637,025 | McCormick | July 26, 1927 |
| 1,779,480 | Loomis | Oct. 28, 1930 |
| 1,995,135 | Williams et al. | Mar. 19, 1935 |
| 2,085,040 | Post | June 29, 1937 |
| 2,117,078 | Brauer | May 10, 1938 |
| 2,455,917 | Crake | Dec. 14, 1948 |